June 23, 1931.  W. A. FOSS  1,811,266

FISHING REEL

Filed Dec. 10, 1923

Inventor
William A. Foss
By Fred Gerlach
Atty.

Patented June 23, 1931

1,811,266

UNITED STATES PATENT OFFICE

WILLIAM A. FOSS, OF CLEVELAND, OHIO, ASSIGNOR TO AMERICAN FORK & HOE COMPANY, OF CLEVELAND, OHIO, A CORPORATION OF OHIO

FISHING REEL

Application filed December 10, 1923. Serial No. 679,544.

The invention relates to fishing reels and its object is to prevent the line from becoming entangled or overrunning while casting out the line. In practice, it has been a desideratum to provide a fishing reel in which automatic provision is made for this purpose without acting as sufficient drag upon the line or spool to substantially lessen the distance of the cast, and this object is attained in the present invention by providing an inertia governor or weight which is rotatable with the spool, so that it will prevent overrunning and the consequent tangling of the line in casting the bait. A further object of the invention is to provide improved means for controlling the line in casting to prevent its overrunning, which is disposed inside of a cylinder on the spool. Other objects of the invention will appear from the detailed description.

The invention consists in the several novel features hereinafter set forth and more particularly defined by claims at the conclusion hereof.

Figure 1:
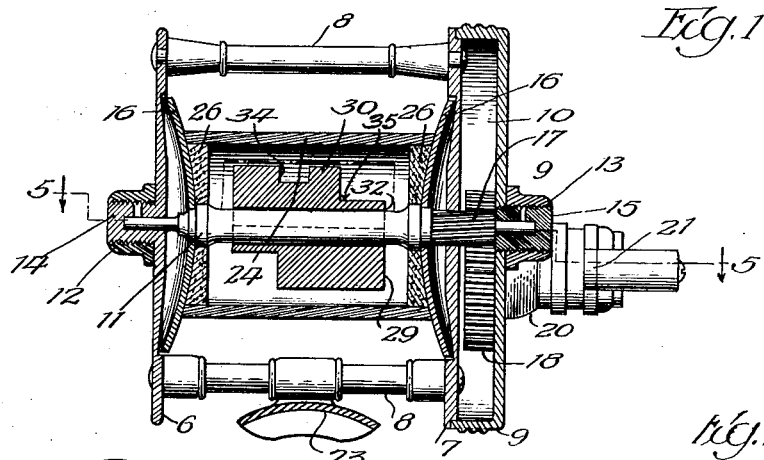
Figure 2:
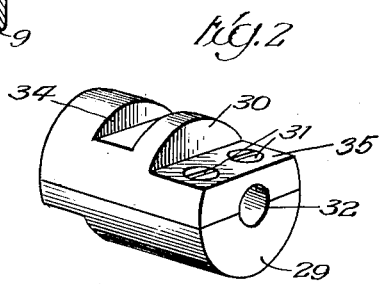
Figure 3:
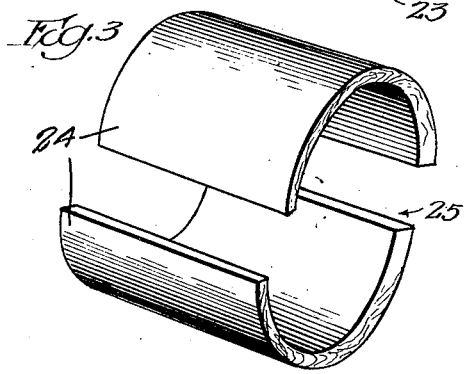
Figure 4:
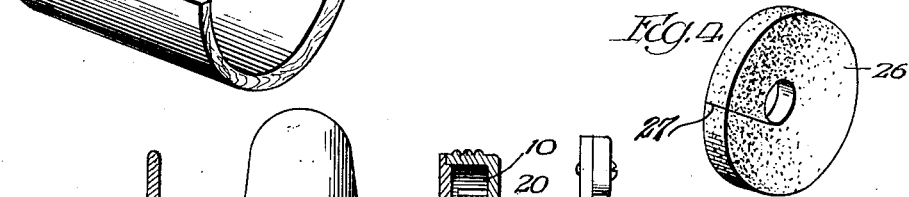
Figure 5:
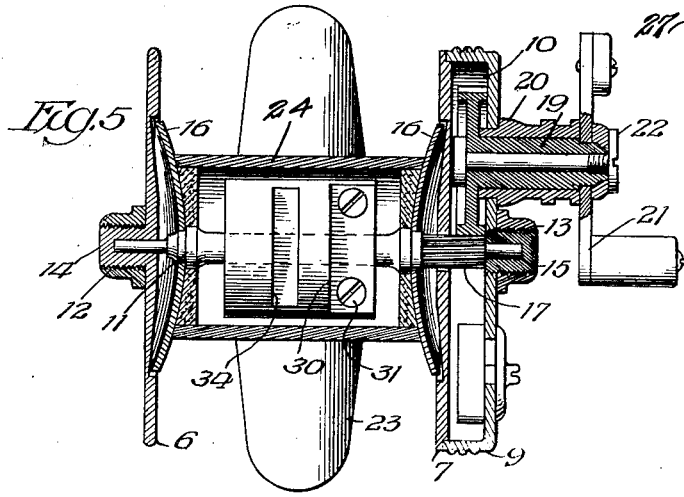

In the drawings: Fig. 1 is a transverse axial section of a fishing reel embodying the invention. Fig. 2 is a perspective view of the inertia governor for controlling the line in casting. Fig. 3 is a detail perspective view of the sections of the cylinder attached to the spool to provide an enclosure for the governor and also to serve as an enlarged winding element for the line. Fig. 4 is a detail view of one of the disks for positioning the cylinder on the spool. Fig. 5 is a section taken on line 5—5 of Fig. 1.

The invention is exemplified in a fishing reel comprising a frame consisting of side plates 6 and 7, rods 8, between and rigidly cross-connecting the plates, and a cap 9 suitably connected to the frame to provide a chamber 10 for the gearing for driving the spool. A spool on which the line is wound comprises a shaft 11 having its terminals journalled in bearings 14 and 15 on the frame-side 6 and the cap 9 respectively and sides or flanges 16 which are rigidly secured to the shaft. The gearing for rotating the spool to wind up the line comprises a pinion 17 rigid with shaft 11, a gear-wheel 18, meshing with the pinion and integral with a hollow-shaft 19 which is journalled in a bearing 20 in cap 9, and a balanced crank 21, which is rigidly secured to shaft 19 by a screw 22. The frame is provided with a curved plate 23, whereby the reel may be secured to the rod by the usual slidable retaining band thereon. The frame, spool and gearing may be of any suitable construction, as well understood in the art.

In order to provide a body for the spool, on which the line is wound, of sufficient diameter to insure a free run in casting and to provide a chamber in the spool for containing the line-retarding means or governor, a cylinder 24, composed of semi-cylindrical sections 25, is concentrically secured to the spool and around shaft 11. Disks 26, which may be of cork, are split, as at 27, so they may be applied around shaft 11 and have outer faces shaped to fit against the inner faces of the spool-sides 16 respectively. The sections of cylinder 24 are preferably formed of wood and fit around the disks 26, and after having been put in place on the disks, may have their contiguous edges united by glue or any other suitable means, so they will be firmly attached to the spool. This hollow cylinder exemplifies a construction which may be applied to the spool of usual construction.

A weight, preferably of metal, is composed of sections 29 and 30 which are secured together by screws 31, and an opening 32 extends longitudinally through the weight so that it will be more loosely held on the central portion of the shaft 11 of the spool. This weight is loosely held on the shaft, so that it will act as an inertia governor for retarding the spool in casting the line. When the friction between the shaft and the spool is sufficient, it will cause the weight to rotate with the spool at a differential speed relatively thereto. Initially, when the bait on the line exerts a sudden pull thereon in casting, the inertia of the weight will act in greater degree to retard the spool until it commences to rotate therewith. This device has been found, in practice, to act as a governor or retarding means for the line in casting, which will prevent the overrunning of the spool and consequent entangling of the line in casting, and until the bait ceases to pull out the line, so that it is not necessary for the fisherman to "thumb" the spool during the cast or until the cast has been completed. This result is accomplished without materially decreasing the length of the cast. When the bait strikes the water, the fisherman will manually stop the spool, and then the weight will be free to revolve around the spool shaft, so that it will not shock the spool when the latter is suddenly stopped.

The weight is provided with a notch 34, so that it will be unbalanced on the shaft 11. As a result, when the weight is revolving, it sets up sufficient vibration in the spool to produce a tendency to release the strand of line leaving the spool from adjacent convolutions, to facilitate the paying out of the line in casting. The opposite ends of the weight-sections are cut away to form flat faces 35 which, in rotation, will cause the weight to be atmospherically retarded.

The invention exemplifies a fishing reel in which an inertia governor is applied to retard the spool in casting the line; in which the governor is disposed inside of the spool body; which is adapted to be applied to a reel of usual construction; and in which provision is made for setting up a vibration of the spool to release the line in casting.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing reel, the combination of a frame adapted to be secured to a fishing rod, a spool mounted rotatably in the frame and comprising a hollow cylinder and a shaft extending through the cylinder, means for operating the spool to wind a line on the cylinder and an elongated element completely surrounded by and housed within the cylinder, said element being mounted longitudinally along and loosely on the shaft and adapted to engage frictionally the latter to retard the spool in casting the line.

2. In a fishing reel, the combination of a frame adapted to be secured to a fishing rod, a spool mounted rotatably in the frame and comprising a hollow cylinder, side flanges and a shaft extending through the cylinder, means for operating the spool to wind a line on the cylinder, and an element disposed in said cylinder between the side flanges and loosely mounted on and frictionally engaging the shaft to retard the spool in casting the line.

3. In a fishing reel, the combination of a frame adapted to be secured to a fishing rod, a spool comprising a hollow cylindrical portion rotatably mounted in the frame, means for operating the spool to wind a line on the cylindrical portion thereof, and an element disposed within the hollow cylindrical portion of the cylinder and having an unbalancing portion offset relatively to the axis of the spool and being connected to rotate with the spool so as to vibrate it in casting the line.

4. In a fishing reel, the combination of a frame adapted to be secured on a fishing rod, a spool rotatably mounted in the frame comprising a shaft and a hollow winding cylinder, means for operating the spool to wind a line thereon, and an unbalanced weight pivotally mounted on and frictionally rotatable by the shaft and disposed within the cylinder of the spool.

5. In a fishing reel, the combination of a frame adapted to be secured to a fishing rod, a spool rotatably mounted in the frame comprising a shaft and a hollow sectional cylinder around the shaft, means for operating the spool to wind a line thereon, and a weight disposed in the cylinder and loosely mounted on and frictionally engaging the shaft to retard the spool in casting the line, said weight being formed of sections removably secured together.

6. In a fishing reel, the combination of a frame adapted to be secured on a fishing rod, a spool rotatably mounted in the frame comprising a hollow cylinder, a shaft and side-flanges, means for operating the spool to wind a line thereon, and a sectional unbalanced weight mounted on the shaft and within the cylinder and frictionally rotatable by the shaft.

7. In a fishing reel, the combination of a frame adapted to be secured to a fishing rod, a spool rotatably mounted in the frame, comprising a hollow cylinder and side flanges, means for operating the spool to wind a line thereon, and means disposed within the cylinder between the side flanges for vibrating the spool in casting the line.

8. In a fishing reel, the combination of a frame adapted to be secured to a fishing rod, a spool rotatably mounted in the frame, comprising a hollow cylinder and side flanges, means for operating the spool to wind a line thereon, and a weight disposed within the cylinder between the side flanges and adapted to impart vibratory movement to the spool in casting the line.

9. In a fishing reel, the combination of a frame adapted to be secured on a fishing rod, a spool rotatably mounted in the frame, the spool comprising a hollow cylindrical winding portion, means for operating the spool to wind a line on the cylindrical portion thereof, and a dynamically unbalanced weight disposed within the hollow portion of the spool and frictionally rotatable thereby.

10. In a fishing reel, the combination of a frame adapted to be secured on a fishing rod, a spool rotatably mounted in the frame comprising a shaft and a hollow winding cylinder, means for operating the spool to wind a line on the cylinder thereof and a dynamically unbalanced weight pivotally mounted on and frictionally rotatable by the shaft and disposed within the cylinder of the spool.

Signed at Cleveland, Ohio, this 26th day of November, 1923.

WILLIAM A. FOSS.